United States Patent
Tajima et al.

(10) Patent No.: US 6,852,003 B2
(45) Date of Patent: Feb. 8, 2005

(54) METHOD OF MANUFACTURING GLASS SUBSTRATE FOR DATA RECORDING MEDIUM

(75) Inventors: Hirokazu Tajima, Osaka (JP); Tamaki Horisaka, Osaka (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 10/807,676

(22) Filed: Mar. 24, 2004

(65) Prior Publication Data

US 2004/0198193 A1 Oct. 7, 2004

(30) Foreign Application Priority Data

Mar. 28, 2003 (JP) ........................... 2003-091124

(51) Int. Cl.$^7$ .............................................. B24B 49/00
(52) U.S. Cl. ................................................ 451/6; 451/41
(58) Field of Search ........................... 451/6, 8, 41, 42, 451/59

(56) References Cited

U.S. PATENT DOCUMENTS

| | | | | |
|---|---|---|---|---|
| 6,537,648 B1 | * | 3/2003 | Takahashi et al. | 428/141 |
| 6,686,023 B2 | * | 2/2004 | Takahashi et al. | 428/141 |
| 2003/0077982 A1 | * | 4/2003 | Takizawa | 451/36 |
| 2004/0180611 A1 | * | 9/2004 | Tajima et al. | 451/41 |

FOREIGN PATENT DOCUMENTS

JP          2002-092867          3/2002

* cited by examiner

Primary Examiner—Dung Van Nguyen
(74) Attorney, Agent, or Firm—Marsh Fischmann & Breyfogle LLP

(57) ABSTRACT

A glass substrate for a data recording medium is manufactured by using a tabular carrier with circular holes formed therein, housing disk-shaped glass workpieces in the circular holes of this carrier, sliding polishing pads over the surface of the carrier and the principal surfaces of the glass workpieces and polishing the glass workpieces until the height (NRa) of micro-waviness on the principal surfaces of the glass workpieces is reduced to a predetermined value or less. The height (NRa) of micro-waviness of the principal surfaces is a value dependent on the surface roughness of the polishing pad and the surface roughness of this polishing pad is a value dependent on the surface roughness of the carrier. A glass substrate for a data recording medium is manufactured by reducing the surface roughness (Ra) of the carrier to 0.08 μm or less and polishing the glass workpieces until the height (NRa) of micro-waviness on the principal surfaces measured using a three-dimensional surface structure analysis microscope whose measuring wavelength (λ) is set to 0.2 to 1.4 mm is reduced to 0.12 nm or less.

16 Claims, 2 Drawing Sheets

METHOD OF MANUFACTURING GLASS SUBSTRATE FOR DATA RECORDING MEDIUM

BACKGROUND OF THE INVENTION

The present invention relates to a method of manufacturing a glass substrate for a data recording medium, used for a magnetic disk, a magneto-optic disk, or an optical disk, which are a magnetic recording medium for data recording devices such as hard disks.

Conventionally, in order to allow high-density recording in the above described glass substrate for a data recording medium (hereinafter referred to as a "glass substrate"), it is necessary to finish the principal surface on which data is recorded as smooth as possible. For this reason, polishing is applied to smooth the principal surface of the glass substrate using a polishing pad during manufacturing. With regard to this polishing, there is a proposal for a method of manufacturing a glass substrate that improves a micro-waviness value, which is a value representing the smoothness of the principal surface taking advantage of a phenomenon that the value of micro-waviness of a glass substrate depends on the surface roughness of the polishing pad (e.g., see Japanese Laid-Open Patent Application No. 2002-92867). According to this manufacturing method, by selecting a polishing pad with optimal surface roughness to be used for polishing, a glass substrate is manufactured so that micro-waviness on the principal surface reaches a predetermined value.

However, according to the conventional method described above, even if a polishing pad with good surface roughness is selected, micro-waviness may not reach the predetermined value during polishing. Since a micro-waviness value of a glass substrate depends on the value of surface roughness of the polishing pad, the fact that the micro-waviness value does not reach a predetermined value may be attributable to occasional roughness of the surface of the polishing pad during polishing. For this reason, it cannot always be determined that selecting a polishing pad with optimal surface roughness allows manufacturing of a glass substrate having a principal surface with desired micro-waviness.

SUMMARY OF THE INVENTION

The present invention has been implemented in view of the above described problems of the prior art. It is an object of the present invention to provide a method of manufacturing a glass substrate for a data recording medium capable of suppressing generation of roughness on the surface of a polishing pad during polishing and preventing any deterioration of surface quality due to the generation of this roughness.

To achieve the foregoing and other objectives of the present invention, a method of manufacturing a glass substrate for a data recording medium is provided. The method includes: housing disk-shaped glass workpieces in circular holes formed in a tabular carrier, with said carrier having a surface roughness of 0.08 μm or less; and polishing principal surfaces of the glass workpieces by sliding a polishing pad over said carrier and glass workpieces, until the principal surfaces of the glass workpieces have micro-waviness of 0.12 nm or below measured using a three-dimensional surface structure analysis microscope whose measuring wavelength is set to 0.2 to 1.4

The present invention also provides another method of manufacturing a glass substrate for a data recording medium. The method includes: forming circular holes in a tabular carrier having a surface roughness of 0.08 μm or less; housing disk-shaped glass workpieces in the circular holes of the carrier; and sliding polishing pads over the surface of said carrier and the principal surfaces of the glass workpieces and polishing the glass workpieces until the height of micro-waviness on the principal surfaces measured using a three-dimensional surface structure analysis microscope whose measuring wavelength is set to 0.2 to 1.4 mm is reduced to 0.12 nm or less.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

With reference now to the attached drawings, an embodiment of the present invention will be explained in detail below.

A glass substrate for a data recording medium is formed in a disk shape and has a circular hole in the center. The surface area of the glass substrate except its outer surface and inner surface constitutes a principal surface. By forming a magnetic film, protective film, etc., made of metal such as cobalt (Co), chromium (Cr), iron (Fe) or an alloy thereof on the principal surface of this glass substrate, a data recording medium such as a magnetic disk, magneto-optical disk or optical disk is created. Then, recording information such as magnetic recording information and magneto-optic recording information is recorded on the principal surface of the glass substrate.

The glass substrate is manufactured by polishing the principal surface of a glass workpiece which is cut out of a sheet of glass plate into a disk shape using a polishing apparatus. As this glass workpiece, one made of a glass material of multiple components such as soda lime glass, aluminosilicate glass, borosilicate glass, crystallized glass manufactured using a floating process, down draw process, redraw process or press process is used.

Figure 2:
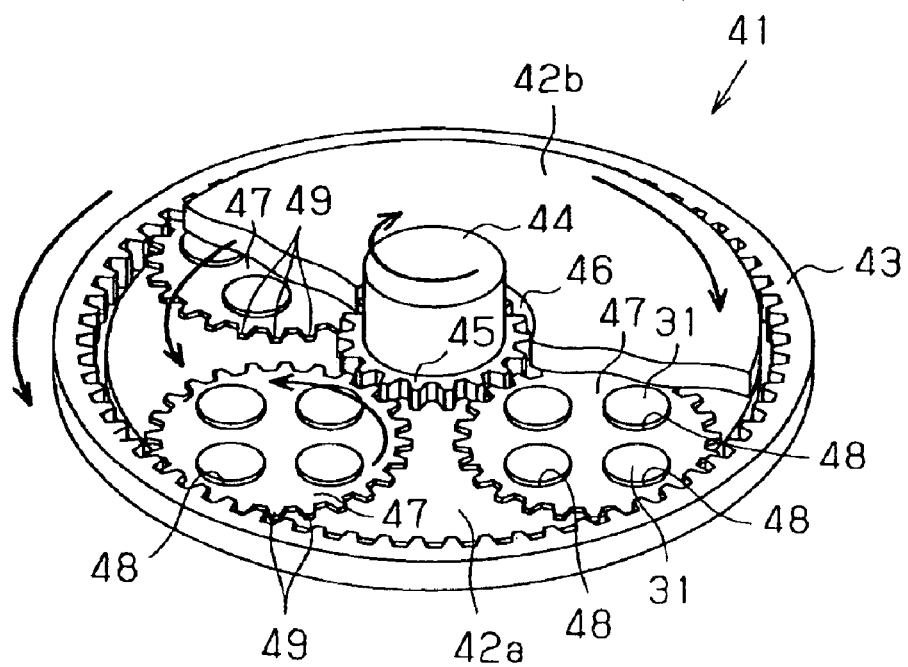
FIG. 2 is a partially exploded perspective view of a batch type polishing apparatus.

As shown in FIG. 2, the polishing apparatus 41 is provided with a disk-shaped upper surface plate 42b and a lower surface plate 42a spaced in parallel in the vertical direction and a ring-shaped internal gear 43 placed in such a way as to enclose the upper surface plate 42b and lower surface plate 42a. A rotation shaft 44 protrudes in the center of the lower surface plate 42a and a sun gear 45 is placed on the outer surface at the bottom of the rotation shaft 44. An insertion hole 46 is formed in the center of the upper surface plate 42b and the rotation shaft 44 is inserted in the insertion hole 46. These upper surface plate 42b, lower surface plate 42a, internal gear 43 and sun gear 45 are driven by a motor, so as to be able to rotate independently of one another.

A plurality of carriers 47 are provided sandwiched between the lower surface plate 42a and upper surface plate 42b. A plurality of circular holes 48 are formed in each carrier 47 and a glass workpiece 31 is housed in each circular hole 48. Furthermore, gear teeth 49 are formed on the circumference of each carrier 47 and the gear teeth 49 engage with the internal gear 43 and sun gear 45.

Polishing pads made of synthetic resin foam are placed on the surfaces of the lower surface plate 42a and upper surface plate 42b of the polishing apparatus 41 as required. The glass workpieces 31 are housed in the circular holes 48 of the carrier 47 and sandwiched between the lower surface plate 42a and upper surface plate 42b or between a pair of polishing pads. In this condition, the surfaces of the glass workpieces 31 are supplied with a polishing agent from a supply section (not shown) through the lower surface plate 42a and upper surface plate 42b and polishing pads. That is, a plurality of supply holes (not shown) are formed in the lower surface plate 42a and upper surface plate 42b and polishing pads in such a way as to extend in their respective thickness directions and the polishing agent is supplied to these supply holes from the supply section such as a tank containing the polishing agent. Then, when the upper surface plate 42b, lower surface plate 42a, internal gear 43 and sun gear 45 rotate respectively, with the glass workpieces 31 contacting the lower surface plate 42a and upper surface plate 42b or polishing pads, each carrier 47 rotates on its own axis and at the same time revolves around the rotation shaft 44 and in this way, the surfaces of the glass workpieces 31 are polished.

The glass substrates are manufactured by polishing the glass workpieces 31 using this polishing apparatus 41 until the height (NRa) of micro-waviness on the principal surface becomes 0.12 nm or less. The height (NRa) of micro-waviness on the principal surface of the glass substrate is 0.12 nm or less. Furthermore, surface roughness (Ra) of the principal surface of the glass substrate is preferably 0.4 nm or less and the waviness height (Wa) on the principal surface is preferably 0.5 nm or less. The surface roughness Ra indicates a value measured using an atomic force microscope (AFM). The waviness height Wa indicates a value measured by scanning a predetermined area of the surface with white light having a measuring wavelength ($\lambda$) of 0.4 to 5.0 mm using a multifunction disk interferometer (Optiflat) manufactured by Phase Metrix Corporation. The micro-waviness height NRa indicates a value measured by scanning a predetermined area of the surface with white light having a measuring wavelength ($\lambda$) of 0.2 to 1.4 mm using a three-dimensional surface structure analysis microscope (NewView200) manufactured by Zygo Corporation.

In this glass substrate, when the surface roughness Ra and waviness height Wa exceed 0.4 nm and 0.5 nm, respectively, the surface may be roughened and its surface quality may deteriorate with reduced smoothness. Here, in order to realize high recording density in the data recording medium, it is necessary to shorten the distance between the head used to scan recording information and the principal surface of the data recording medium. If asperities exist on the principal surface of the data recording medium, the head cannot pass over or follow the asperities on the surface of the data recording medium when it moves, and problems such as the head colliding with or being caught by asperities are likely to occur. Such problems become more noticeable especially when the micro-waviness height NRa exceeds 0.12 nm. Therefore, the micro-waviness height NRa is reduced to 0.12 nm and to prevent such problems from occurring, by polishing its principal surface, the glass substrate for a data recording medium, to acquire a high degree of smoothness and high surface quality.

Next, the method of manufacturing the above described glass substrate will be explained.

The glass substrate is manufactured through a machining process, a chamfering process, a lapping process, a polishing process and a cleaning process.

In the machining process, a sheet of glass plate is cut using an ultra-hard alloy or diamond cutter and a disk-shaped glass workpiece having a circular hole in the center is formed. In the chamfering process, the inner surface and outer surface of the glass workpiece is ground and the corners are chamfered, the outer diameter and inner diameter are adjusted to predetermined sizes, and the inner surface and outer surface are polished flat.

In the lapping process, the glass workpiece is subjected to a lapping process, overall warpage of the glass workpiece is corrected and the glass workpiece is thereby transformed into a substantially flat plate. This lapping process is carried out using the polishing apparatus 41, by supplying a polishing agent to the principal surfaces of the glass workpieces 31 and polishing the principal surfaces with the lower surface plate 42a and upper surface plate 42b sliding on those surfaces. Furthermore, alumina grain, etc., is used as an abrasive grain and this abrasive grain is dispersed in water and slurried and used for the lapping process polishing agent.

In the polishing process, polishing is carried out using the polishing apparatus 41 with polishing pads attached to the lower surface plate 42a and upper surface plate 42b and causing the polishing pads to slide over the principal surfaces of the glass workpieces 31. In this polishing process, the principal surfaces of the glass workpieces with the polishing pads sliding thereover are polished into smooth surfaces and the surface quality is thereby improved.

In the cleaning process, a cleaning liquid is used and the polishing agent, abrasive powder, dust, etc., stuck to the principal surfaces of the polished glass workpieces are removed and in this way a glass substrate having a principal surface with improved surface quality and cleanness is manufactured.

The polishing process is carried out divided into two steps; a first polishing step for rough-polishing the principal surfaces of the glass workpieces smoothly and a second polishing step for precision-polishing the roughly polished principal surfaces of the glass workpieces to further smoothness.

The first polishing step refers to processing which rough-polishes the glass workpieces, reduces the overall thickness to a predetermined value and removes defects on the principal surfaces such as small warpage, undulations, chipping, cracks. These defects are formed within a certain thickness range from the principal surface of the glass workpiece and are removed from the principal surfaces by polishing part of the principal surfaces to reduce the overall thickness of the glass workpieces to a predetermined value. Among these defects, undulations on the surfaces in particular are formed in striped patterns on the surfaces of the glass plates when the glass workpieces are manufactured using the aforementioned floating method, etc., and are latent defects which exist in the glass workpieces. It is a principal object of the first polishing step to improve these undulations on the surfaces.

Through rough-polishing of the first polishing step, to remove parts containing defects from the principal surfaces of the glass workpieces, primary importance is attached to the machining allowances. Furthermore, the polishing process is carried out for the purpose of smoothing the principal surfaces of the glass workpieces, and therefore the fact that the surfaces of the glass workpieces become rougher after the first polishing step than before the polishing is contrary to the purpose of the polishing process. For this reason, in the first polishing step, in order to smooth the principal surfaces of the glass workpieces more than before the polishing, primary importance is also attached to the prevention of damage to the principal surfaces of the glass workpieces due to rough-polishing. In the first polishing step, a hard polisher is used as the polishing pad, which has a degree of hardness that allows the principal surfaces of the glass workpieces to be shaved without being greatly damaged.

This hard polisher is made of synthetic resin foam such as polyurethane, polyester and sponge-like foam of such loose texture that its surface pores are visible. The hard polisher preferably has a hardness of 65 to 95 of JIS A as classified in Japanese Industrial Standard (JIS) K6301. Furthermore, its compression modulus is preferably 60 to 80%. It is preferable to use the hard polisher adhered to the lower surface plate 42a and upper surface plate 42b in such a way that its compression rate becomes 1 to 4%.

When the JIS A hardness is less than 65, the compression modulus is less than 60% or the compression rate is higher than 4%, the hard polisher may not have the desired hardness and take a long time to reach certain machining allowances. In addition, the hard polisher may deform during polishing, and projections, depressions, undulations, and etc., may be formed on its surface and defects such as undulations may be formed on the principal surfaces of the glass workpieces, making is impossible to smooth the principal surfaces. When the JIS A hardness is greater than 95, the compression modulus is higher than 80% or when the compression rate is less than 1%, the principal surfaces of the glass workpieces may be damaged by the hard polisher, the principal surfaces may become rough and the surface quality may deteriorate, instead.

The second polishing step refers to processing which precision-polishes the glass workpieces, shaves off extremely small portions of the surfaces and corrects micro defects such as micro-waviness, micro asperities on the surfaces. Most of these micro defects are formed due to polishing traces during the lapping process and first polishing step or distortion by stress during polishing. Trying to shave totally off defects such as undulations as well as micro defects causes polishing traces, etc., to form on the principal surfaces of the glass workpieces when micro defects are shaved off, which become new defects, instead increasing micro defects. For this reason, by shaving off only upper portions of micro defects, for example, hills in the case of micro-waviness or projections in the case of micro asperities, asperities are evened and corrected to be flat and smooth. It is a primary object of the second polishing step to correct such micro-waviness of the principal surfaces and improve surface roughness.

Through precision polishing of the second polishing step, the principal surfaces of the glass workpieces are polished and evened to mirror-like smooth and flat surfaces, and therefore primary importance is attached not to machining allowances, but to shaving off of only the upper portions of micro defects without damaging the principal surfaces of the glass workpieces. For this reason, in the second polishing step, a soft polisher is used as the polishing pad, which has a degree of softness which allows the principal surfaces of the glass workpieces to be polished without being shaved off considerably.

For the soft polisher used in the second polishing step, a polisher is used made of synthetic resin foam such as polyurethane, polyester, having suede-like fine texture such that it is difficult to see through pores on the surface. The soft polisher preferably has a hardness of 58 to 85 (Asker C) as classified in SRIS-0101 (SRIS: Society of Rubber Industry Japan Standards). Furthermore, the compression modulus is preferably 58 to 90%. It is preferable to use the soft polisher adhered to the lower surface plate 42a and upper surface plate 42b in such a way that its compression rate becomes 1 to 5%.

When the Asker-C hardness is less than 58, the compression modulus is less than 58% or the compression rate is higher than 5%, the soft polisher may deform during polishing, projections, depressions, undulations, and etc., may be formed particularly on its surface and micro-waviness may be thereby formed on the surface of the manufactured glass substrate. Furthermore, when the Asker-C hardness is higher than 85, the compression modulus is higher than 90% or the compression rate is less than 1%, the soft polisher may damage the surfaces of the glass workpieces, and the manufactured glass substrates may instead have rough surfaces. This suede-like soft polisher has hardness that is essentially greatly different from that of a sponge-like hard polisher, and it is difficult to compare the two based on the same standard. For this reason, hardness of the hard polisher is expressed with JIS A hardness, while hardness of the soft polisher is expressed with Asker-C hardness.

Figure 1:
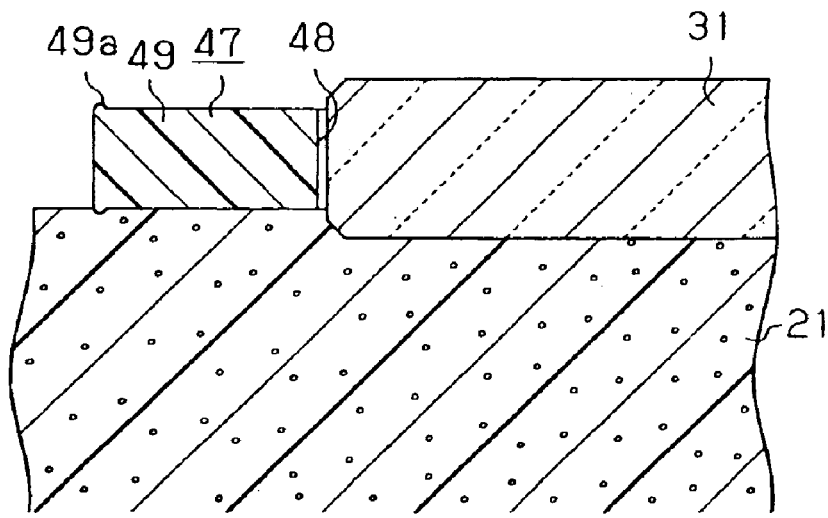
FIG. 1 is a cross-sectional view showing a state in which a glass workpiece is polished.

In the case of the second polishing step, when the situation in which the surface of the glass workpiece is polished using the soft polisher made of foam is examined in detail, as schematically shown in FIG. 1, a soft polisher 21 pressed against a glass workpiece 31 is deformed and its surface is slid not only over the surface of the glass workpiece 31 but also over the surface of a carrier 47. In this case, if the surface of the carrier 47 is rough, the soft polisher 21 is damaged through the sliding over the carrier 47 and its surface becomes rough. Then, in the case of the glass workpiece 31 polished by that soft polisher 21, micro defects on the principal surface are not sufficiently corrected, and instead the principal surface is damaged and its surface quality deteriorates. In other words, it is not possible to correct micro-waviness sufficiently, which is the object of the second polishing step and the glass substrate manufactured has the aforementioned NRa exceeding 0.12 nm.

As shown above, if the surface of the carrier 47 is rough, the surface of the soft polisher 21 is roughened during polishing and the micro-waviness height NRa on the principal surface of the glass workpiece 31 increases. On the contrary, if the surface of the carrier 47 is smooth, the surface of the soft polisher 21 is not roughened during polishing, micro defects on the principal surface are corrected sufficiently and the micro-waviness height NRa on the principal surface of the glass workpiece 31 decreases. That is, a phenomenon exists between the glass workpiece 31, soft polisher 21, and carrier 47 in which the micro-waviness height NRa on the principal surface has a value dependent on the surface roughness of the soft polisher 21, and the surface roughness of this soft polisher 21 has a value dependent on the surface roughness of the carrier 47. Therefore, based on this phenomenon, the present inventor et al. discovered that there was a close relationship between the micro-waviness height NRa on the principal surface and surface roughness of the carrier 47, selected the surface roughness of the carrier 47 and thereby reduced the micro-waviness height NRa on the principal surface of the glass substrate to 0.12 nm or less.

Here, the fact that there is a close relationship between the micro-waviness height NRa on the principal surface of the glass substrate and the surface roughness of the carrier 47 was discovered for the first time through many experiments by the present inventor et al. and analyses of those results. That is, as shown in FIG. 1, the thickness of the carrier 47 is smaller than that of the glass workpiece 31 and it has been conventionally believed that even if the soft polisher 21 slides over the carrier 47, its influence on polishing would be so small as to be negligible. For this reason, while the surface roughness of the soft polisher 21 which directly slides over the principal surface of the glass workpiece 31 was considered with emphasis, no consideration was given to the possibility that the surface roughness of the carrier 47 would have a large influence on the surface roughness of the soft polisher 21.

Figure 3:
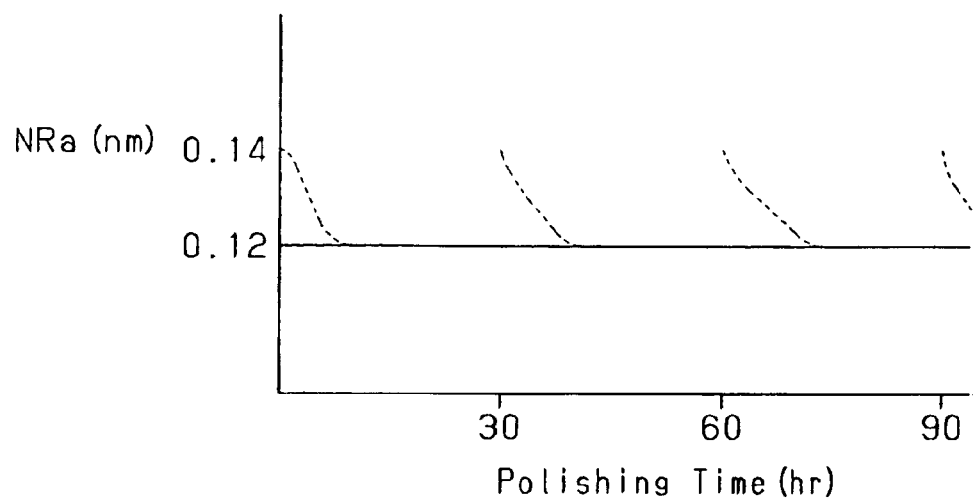
FIG. 3 is a graph showing a relationship between a polishing time and a micro-waviness value.

On the contrary, in pursuit of the cause of the deterioration of the micro-waviness height NRa, the present inventor et al. polished a plurality of glass workpieces 31 of one polishing apparatus 41 and measured the micro-waviness height NRa on the principal surface after the polishing. As shown in FIG. 3, a relationship between total polishing time and micro-waviness height NRa at one polishing apparatus 41 was examined and as a result, as shown by dotted lines in the graph, a conclusion was obtained that the micro-waviness height NRa became 0.14 nm at predetermined time intervals exceeding the preceding height NRa. Furthermore, the micro-waviness height NRa deteriorated up to 0.14 nm and then decreased gradually with time to 0.12 nm or less after a predetermined time. Then, the present inventor et al. discovered that the time until this micro-waviness height NRa deteriorated coincided with the time for replacing the carrier 47.

That is, the carrier 47 cracks or the gear teeth 49 break, etc., during polishing, and therefore the carrier 47 is replaced at predetermined time intervals. Assuming that the replaced new carrier 47 has an influence on the NRa, the new carrier 47 was compared with the old carrier 47 before the replacement and as a result, a large difference in surface roughness was measured. Then, the surface of the carrier 47 was roughed immediately after the replacement and it roughened the surface of the soft polisher 21 during polishing, but its surface was polished and smoothed by the soft polisher 21 during operation, thus no longer roughening the surface of the soft polisher 21, and therefore a conclusion was reached that the micro-waviness height NRa was also improved. Therefore, from the conventional phenomenon that micro-waviness on the principal surface has a value dependent on the surface roughness of the soft polisher 21, it is not easily inferable from analogy that there is a close relationship between the micro-waviness height NRa on the principal surface and surface roughness of the carrier 47.

More specifically, the surface roughness of the carrier 47 is expressed by roughness average (Ra) measured using a probe sensor whose cut-off value ($\lambda$) is set to 80 $\mu$m and is 0.08 $\mu$m or less. When the roughness average Ra of the surface of the carrier 47 exceeds 0.08 $\mu$m, the surface of the soft polisher 21 is roughened and it is no longer possible to reduce the micro-waviness height NRa of the polished glass plate 31 to 0.12 nm or less.

In order to reduce the roughness average Ra of the surface of the carrier 47 to 0.08 $\mu$m or less, it is preferable to apply polishing to the carrier 47 for polishing the surface before using the carrier for polishing. This polishing refers to processing which polishes the surface of the carrier 47 using a grinding member such as a grinder, sandpaper, etc. It is preferable to use a grinding member for polishing having a grade of #200 to #1000. If the grade of the grinding member is less than #200, it may roughen the surface of the carrier 47 instead and its roughness average Ra may exceed 0.08 $\mu$m. If the grade of the grinding member is higher than #1000, polishing takes a long time, which may result in problems such as deterioration of work efficiency, reduction in the amount of production, etc.

On the other hand, as shown in FIG. 2, during polishing, a protrusion 49a called "curling" is formed with high probability in the periphery of the gear teeth 49 of the carrier 47 which engages with the internal gear 43 and sun gear 45. When such a protrusion 49a is formed, the protrusion 49a damages the surface of the soft polisher 21, causing fluffing, projections, depressions, and etc. Therefore, in order to suppress the formation of such protrusions 49a, it is preferable to use a carrier 47 with high strength and durability.

To increase the strength and durability, the carrier 47 is preferably made by molding synthetic resin with an aggregate of alamido fiber or glass fiber. In this way, using alamido fiber or glass fiber as the aggregate can suppress cracking or deformation, etc., of the carrier 47 and improve strength and durability thereof. Furthermore, epoxy resin, nylon resin, etc., are types of synthetic resin which can be used as the carrier material. Using a synthetic resin such as epoxy resin or nylon resin can also improve strength and durability and reduce the frictional force against the soft polisher 21. Improving strength and durability of the carrier 47 can suppress the formation of the protrusion 49a and also reduce the number of times the carrier 47 is replaced to increase the amount of production while maintaining surface quality.

More specifically, the hardness of the carrier 47 is Rockwell hardness measured in compliance with JIS K7202 and is preferably 120 to 130. The Rockwell hardness is a value measured when a steel sphere having a diameter of 6.35 mm is pressed against the surface of the carrier 47 with a load of 100 kg. When the carrier 47 has a Rockwell hardness of less than 120, problems such as damage to the carrier 47 during polishing and formation of the aforementioned protrusion 49a, etc., may occur more frequently and the soft polisher 21 may damage the surface of the carrier 47. When the Rockwell hardness exceeds 130, even applying polishing can hardly reduce the roughness average Ra of the surface of the carrier 47 to 0.08 $\mu$m or below. In addition, the carrier 47 may damage the surface of the soft polisher 21 during polishing, the soft polisher 21 may damage the glass workpiece or its sliding over the carrier 47 during polishing may cause the glass workpiece to fall off or have cracking.

Though it depends on the board thickness, the bending strength of the carrier 47 is preferably 200 to 300 N/mm$^2$ when the board thickness is 0.4 mm and preferably 250 to 350 N/mm$^2$ when the board thickness is 0.6 mm. When the board thickness is 0.4 mm and bending strength is 200 N/mm$^2$ and when the board thickness is 0.6 mm and bending strength is less than 250 N/mm$^2$, the carrier 47 is likely to distort during polishing, problems like breakage of the carrier 47 may occur more frequently and undulations may be formed on the surface of the soft polisher 21 due to distortions of the carrier 47. When the board thickness is 0.4 mm and the bending strength is 300 N/mm$^2$ and when the board thickness is 0.6 mm and the bending strength exceeds 350 N/mm$^2$, its contact with the carrier 47 during polishing is likely to cause problems such as damaging the glass workpiece or producing cracks.

In addition, with regard to the breaking load of the carrier 47, though it depends on the board thickness, when the board thickness is 0.4 mm, the bending strength breaking load is preferably 35 to 45 N, tensile strength breaking load is 800 to 1200 N and tear strength breaking load is 4.0 to 15.0 N. Furthermore, when the board thickness is 0.6 mm, the bending strength breaking load is preferably 100 to 130 N, tensile strength breaking load is 1100 to 1600 N and tear strength breaking load is 7 to 25 N. For each board thickness, when each breaking load is less than a lower limit, the carrier 47 is likely to fall off or have cracking during polishing, causing a reduction of durability. For each board thickness, when each breaking load exceeds an upper limit, its sliding over the carrier 47 during polishing is likely to cause problems such as damaging the glass workpiece or producing cracks.

As described above, when the carrier 47 whose roughness average Ra is set to 0.08 µm or less is used, the surface roughness (arithmetic mean roughness) (Ra) of the soft polisher 21 during polishing measured using a probe sensor whose cut-off value (λ) is set to 80 µm is preferably kept to 6 µm or less. When the roughness average Ra of the soft polisher 21 during polishing exceeds 6 µm, it may not be possible to reduce the micro-waviness height NRa of the glass workpiece 31 after polishing to 0.12 nm or less.

Furthermore, in order to keep the roughness average Ra of the surface of the soft polisher 21 to 6 µm or less, the surface which contacts the carrier 47 is preferably hard enough to prevent it from being affected by the surface roughness of the carrier 47 and at the same time soft enough to prevent it from damaging the glass workpiece 31 instead. As described above, the soft polisher 21 is made of foam and has many pores on its surface. Of the surface of the soft polisher 21, the part directly contacting the surface of the carrier 47 becomes the part which becomes walls making up these pores. Therefore, to specify the hardness of the surface of the soft polisher 21, it is preferable to specify the hardness of these walls.

First, the hardness of this wall can be specified by a 100% modulus which indicates the hardness of synthetic resin used for the material of the soft polisher 21 itself. Then, this 100% modulus is preferably 8.8 to 19.6 MPa. When the 100% modulus is less than 8.8 MPa, there may be problems in that its sliding over the carrier 47 may easily damage the soft polisher 21, may reduce the polishing efficiency with respect to the glass workpiece 31, reduce the amount of production or fail to correct defects sufficiently. When the 100% modulus exceeds 19.6 MPa, this may damage the surface of the glass workpiece 31 during polishing instead.

When this wall becomes thinner or longer, the surface of the soft polisher 21 becomes softer accordingly and is easily damaged by the carrier 47. For this reason, the number of pores on the surface of the soft polisher 21 is preferably 600 to 800 per 1 mm². Furthermore, the diameter of the pores is preferably 10 to 40 µm. The depth of the pores is preferably equal to 1 µm or above and less than 100 µm. When the number of pores is less than 600 and the diameter of the pores is less than 10 µm or the depth is less than 1 µm, the walls become thicker or longer and the surface of the soft polisher becomes excessively hard, which may damage the surface of the glass workpiece 31 during polishing. When the number of pores exceeds 800, the diameter of the pores exceeds 40 µm or the depth exceeds 100 µm, the peripheral walls become thinner or longer, the surface of the soft polisher 21 becomes excessively soft and its sliding over the carrier 47 may easily damage the soft polisher 21.

The amount of compression deformation of the soft polisher is preferably 40 to 60 µm. When the soft polisher is crushed along its thickness direction, this amount of compression deformation can be calculated by subtracting the thickness when the soft polisher is crushed to a limit from the original thickness. When the amount of compression deformation is less than 40 µm, the soft polisher becomes excessively hard and may damage the surface of the glass workpiece during polishing. When the amount of compression deformation exceeds 60 µm, the soft polisher becomes excessively soft and may easily damage the soft polisher 21 through its sliding over the carrier 47.

The effects exhibited by the above described embodiment will be explained below.

The glass substrate in this embodiment is manufactured by the polishing apparatus 41 using the carrier 47 and applying precision polishing to the surface of the glass workpiece 31 with the soft polisher 21 which is a polishing pad, in such a way that the micro-waviness height NRa on the principal surface is 0.12 nm or less. Based on the fact that the micro-waviness height NRa is a value dependent on the surface roughness of the soft polisher 21 and the surface roughness of the soft polisher 21 is a value dependent on the surface roughness of the carrier 47, the roughness average Ra of this carrier 47 is reduced to 0.08 µm or less. This makes it possible to prevent its sliding over the carrier 47 during polishing from roughening the surface of the soft polisher 21 and prevent the surface quality of the glass substrate from deteriorating due to roughness produced on the surface of the soft polisher 21.

Furthermore, the carrier 47 is subjected to polishing for polishing its surface before being used for polishing. For this reason, it is possible to reliably reduce the roughness average Ra of the surface of the carrier 47 to 0.08 µm or less.

The surface roughness (Ra) of the soft polisher 21 measured by a probe sensor whose cut-off value (λ) is set to 0.8 mm is kept to 6 µm or less. This makes it possible to produce a glass substrate of high surface quality at high yield.

For the material of the soft polisher 21, synthetic resin having a 100% modulus of 8.8 to 19.6 MPa is used. For this reason, it is possible to obtain a soft polisher 21 which is hardly damaged in its sliding over the carrier 47.

The amount of compression deformation of the soft polisher 21 is 40 to 60 µm, its surface is provided with 600 to 800 pores per 1 mm² and the diameter of the pores is 10 to 40 µm. This allows the surface of the soft polisher 21 to have hardness sufficient enough to prevent it from damaging the glass workpiece 31 or prevent it from being damaged by the carrier 47.

It should be apparent to those skilled in the art that the present invention may be embodied in many other specific forms without departing from the spirit or scope of the invention. Particularly, it should be understood that the invention may be embodied in the following forms.

To satisfy impact resistance, vibration resistance, heat resistance, etc., required as a data recording medium, it is also possible to apply chemical strengthening processing to the glass workpiece in processes before the polishing process, steps after the polishing process or between processes of polishing. This chemical strengthening processing refers to replacement of mono-valent metal ions such as lithium ions and sodium ions, etc., included in the composition of the glass substrate with mono-valent metal ions such as sodium ions and potassium ions which have larger ion diameters than those of the above described mono-valent metal ions. It is also a method for chemically strengthening the glass substrate by applying compression stress to the surface of the glass substrate. This chemical strengthening processing is carried out by immersing for a predetermined time the glass substrate in chemical strengthening salt that is molten. Specific examples of chemical strengthening molten salt include individual potassium nitrate, sodium nitrate, silver nitrate, etc., or a mixture of at least two of them. The temperature of the chemical strengthening molten salt is a temperature preferably lower than the strain point of the material used for the glass substrate by approximately 50 to 150° C., or more preferably the temperature of the molten salt is approximately 300 to 450° C. When the temperature is lower than the strain point of the material of the glass substrate by approximately 150° C., it is not possible to apply sufficient chemical strengthening processing to the glass substrate. On the other hand, when the temperature exceeds a temperature lower than the strain point of the material of the glass substrate by approximately 50° C., distortion may occur in the glass substrate when chemical strengthening processing is applied to the glass substrate.

This embodiment conducts polishing using a batch type polishing apparatus, but the present invention is not limited to this and it is also possible to use a sheet-type polishing apparatus which manufactures a glass substrate by polishing glass workpieces one-by-one.

If the surface condition such as roughness, warpage, undulations of the glass workpiece after the chamfering process satisfies a predetermined value, the lapping process may be omitted. Such a structure can contribute to shortening of the work time.

In order to reduce the roughness average Ra of the surface of the carrier 47 to 0.08 $\mu$m or less, it is also possible to use other methods instead of the polishing in this embodiment. The other methods include polishing the surface of a metal die used for molding of the carrier 47 and covering the surface of the carrier 47 with a coating agent, etc.

This embodiment uses the carrier 47 in the second polishing step having a surface with an roughness average Ra of 0.08 $\mu$m or less, but the present invention is not limited to this and can also use the carrier 47 in the first polishing step. In this case, it is possible to prevent the carrier 47 from roughening the surface of the hard polisher as the polishing pad.

Therefore, the present examples and embodiments are to be considered as illustrative and not restrictive and the invention is not to be limited to the details given herein, but may be modified within the scope and equivalence of the appended claims.

What is claimed is:

1. A method of manufacturing a glass substrate for a data recording medium, the method comprising:
   housing disk-shaped glass workpieces in circular holes formed in a tabular carrier, with said carrier having a surface roughness of 0.08 $\mu$m or less; and
   polishing principal surfaces of the glass workpieces by sliding a polishing pad over said carrier and glass workpieces, until the principal surfaces of the glass workpieces have micro-waviness of 0.12 nm or below measured using a three-dimensional surface structure analysis microscope whose measuring wavelength is set to 0.2 to 1.4 mm.

2. The method of manufacturing a glass substrate for a data recording medium according to claim 1, wherein said carrier is subjected to surface polishing before being used in the polishing.

3. The method of manufacturing a glass substrate for a data recording medium according to claim 1, wherein the surface roughness of said polishing pad is 6 $\mu$m or less when measured using a probe sensor whose cutoff value is set to 0.8 mm.

4. The method of manufacturing a glass substrate for a data recording medium according to claim 1, wherein said polishing pad is made of foam of a synthetic resin material having a 100% modulus of 8.8 to 19.6 MPa.

5. The method of manufacturing a glass substrate for a data recording medium according to claim 4, wherein an amount of compression deformation of said polishing pad is 40 to 60 $\mu$m.

6. The method of manufacturing a glass substrate for a data recording medium according to claim 4, wherein said polishing pad has 600 to 800 pores per 1 $mm^2$ on the surface thereof.

7. The method of manufacturing a glass substrate for a data recording medium according to claim 4, wherein said polishing pad has pores having a diameter of 10 to 40 $\mu$m on the surface thereof.

8. The method of manufacturing a glass substrate for a data recording medium according to claim 1, wherein said carrier is made by molding synthetic resin with an aggregate of alamido fiber or glass fiber 9. The method of manufacturing a glass substrate for a data recording medium according to claim 8, wherein said carrier has a Rockwell hardness of 120 to 130.

10. A method of manufacturing a glass substrate for a data recording medium, the method comprising:
    forming circular holes in a tabular carrier having a surface roughness of 0.08 $\mu$m or less;
    housing disk-shaped glass workpieces in the circular holes of the carrier; and
    sliding polishing pads over the surface of said carrier and the principal surfaces of the glass workpieces and polishing the glass workpieces until the height of micro-waviness on the principal surfaces measured using a three-dimensional surface structure analysis microscope whose measuring wavelength is set to 0.2 to 1.4 mm is reduced to 0.12 nm or less.

11. The method of manufacturing a glass substrate for a data recording medium according to claim 10, wherein said carrier is subjected to surface polishing before being used in said sliding.

12. The method of manufacturing a glass substrate for a data recording medium according to claim 10, wherein the surface roughness of said polishing pad is 6 $\mu$m or less when measured using a probe sensor whose cutoff value is set to 0.8 mm.

13. The method of manufacturing a glass substrate for a data recording medium according to claim 10, wherein said polishing pad is made of foam of a synthetic resin material having a 100% modulus of 8.8 to 19.6 MPa.

14. The method of manufacturing a glass substrate for a data recording medium according to claim 13, wherein an amount of compression deformation of said polishing pad is 40 to 60 $\mu$m.

15. The method of manufacturing a glass substrate for a data recording medium according to claim 13, wherein said polishing pad has 600 to 800 pores per 1 $mm^2$ on the surface thereof.

16. The method of manufacturing a glass substrate for a data recording medium according to claim 13, wherein said polishing pad has pores having a diameter of 10 to 40 $\mu$m on the surface thereof.

* * * * *